United States Patent
Ogino et al.

(10) Patent No.: US 9,626,135 B2
(45) Date of Patent: Apr. 18, 2017

(54) NETWORK PRINTING SYSTEM, HOST TERMINAL AND NETWORK PRINTER

(71) Applicant: STAR MICRONICS CO., LTD., Shizuoka (JP)

(72) Inventors: Tetsuro Ogino, Shizuoka (JP); Yuji Mori, Shizuoka (JP); Toshiharu Takada, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/162,706

(22) Filed: May 24, 2016

(65) Prior Publication Data

US 2016/0364189 A1    Dec. 15, 2016

(30) Foreign Application Priority Data

Jun. 9, 2015   (JP) ................................ 2015-116292

(51) Int. Cl.
*G06F 3/12* (2006.01)

(52) U.S. Cl.
CPC .......... *G06F 3/1236* (2013.01); *G06F 3/1211* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 2004/0218204 A1* | 11/2004 | Nomura | ................. | H04L 67/02 358/1.14 |
| 2006/0007480 A1* | 1/2006 | Yokokura | ............. | G06F 3/1204 358/1.15 |
| 2006/0033944 A1* | 2/2006 | Kadota | ................. | G06F 3/1207 358/1.13 |
| 2006/0152753 A1* | 7/2006 | Nakai | ................. | G03G 21/046 358/1.15 |
| 2006/0221368 A1* | 10/2006 | Higuchi | ................ | G06F 3/1204 358/1.13 |
| 2006/0282655 A1* | 12/2006 | Yanagi | ................. | G06F 3/1205 713/1 |
| 2007/0030514 A1* | 2/2007 | Shima | ................... | G06F 3/1208 358/1.15 |
| 2011/0013215 A1* | 1/2011 | Yonezawa | ............... | G06F 3/121 358/1.14 |

(Continued)

FOREIGN PATENT DOCUMENTS

JP     10-040025     2/1998

OTHER PUBLICATIONS

Melanie Pinola, "How to Close a Program that it is not responding", Aug. 9, 2011 <http://lifehacker.com/5832505/how-to-close-a-program-that-is-not-responding>.*

*Primary Examiner* — Ming Hon
(74) *Attorney, Agent, or Firm* — Lex IP Meister, PLLC (57) ABSTRACT

Upon completion of print data transmission, the host terminal sends to a network printer a finish command via a print port and further a forced disconnection request command via another communication port. If the finish command is lost due to a network failure, the network printer forcibly disconnects the host terminal from the print port of the network printer in response to the forced disconnection request command, thereby allowing the other host terminals to use the network printer without waiting the elapse of the timeout period.

15 Claims, 7 Drawing Sheets

(56) References Cited

U.S. PATENT DOCUMENTS

| | | | |
|---|---|---|---|
| 2012/0229844 A1* | 9/2012 | Yada | H04N 1/0023 358/1.15 |
| 2015/0371117 A1* | 12/2015 | Ooba | G06K 15/1803 358/1.15 |
| 2016/0054965 A1* | 2/2016 | Tanji | G06F 3/1292 358/1.13 |

* cited by examiner

NETWORK PRINTING SYSTEM, HOST TERMINAL AND NETWORK PRINTER

CROSS-REFERENCE TO RELATED APPLICATION

This application claims priority of Japanese Patent Application No. 2015-116292 filed on Jun. 9, 2015. The contents of this application are incorporated herein by reference in their entirety.

BACKGROUND (a) Technical Field

This invention relates to a network printing system, a host terminal and a network printer, especially to a system adapting a printer to be connected to a network for common use by a plurality of host terminals.

(b) Description of the Related Art

A network printing system is conventionally used in which a printer connected to a network such as LAN and WAN is adapted to be shared by a plurality of host terminals. A printer for such use is called a network printer. A network printer is usually connected to a network via a print server. Another network printer having a built-in print server is directly connected to a network.

In the network printing system, in response to a print command issued from each of the host terminals, any print data sent from each of the host terminals is stored in the print server for print out by the network printer in order. Therefore, well-ordered printing is executed by the network printer even if a print command is issued from a host terminal during print data transmission from another host terminal or during printing another print data for another host terminal.

Any print data from the host terminal is transmitted to the network printer via a print port of the network printer. The print port is previously designated as a destination of print data in the printer driver of each of the host terminals connected to the network. When a single network printer is shared, the print port assigned to the network printer is respectively designated as the destination in each of the host terminals.

Figure 6:
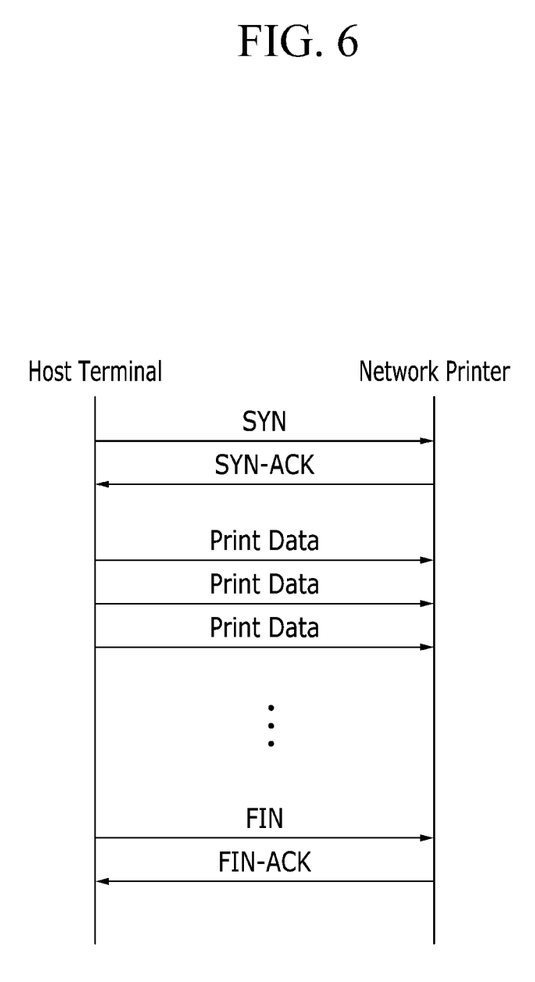
FIG. 6 is a flowchart of an operation example of the conventional art showing that print data transmission is successfully completed without a network failure.

FIG. 6 is a flowchart showing a procedure of print data transmission from the host terminal to the network printer having a built-in print server. Any print data is directly transmitted from the host terminal to the network printer.

As shown in FIG. 6, a connection request command (SYN) is first sent form the host terminal to the network printer as designating the print port as the destination. In response, a connection acknowledgement (SYN-ACK) is returned from the network printer to the host terminal, thereby establishing the connection via the print port. Then print data in a packet unit is transmitted from the host terminal to the network printer in order.

Upon completion of print data transmission, a finish command (FIN) is sent from the host terminal to the network printer. In response, a finish acknowledgement (FIN-ACK) is returned from the network printer to the host terminal, thereby terminating the connection via the print port. Print data as such transmitted to the network printer are stored in an internal buffer (a built-in print server) of the network printer for print out in order.

Figure 7:
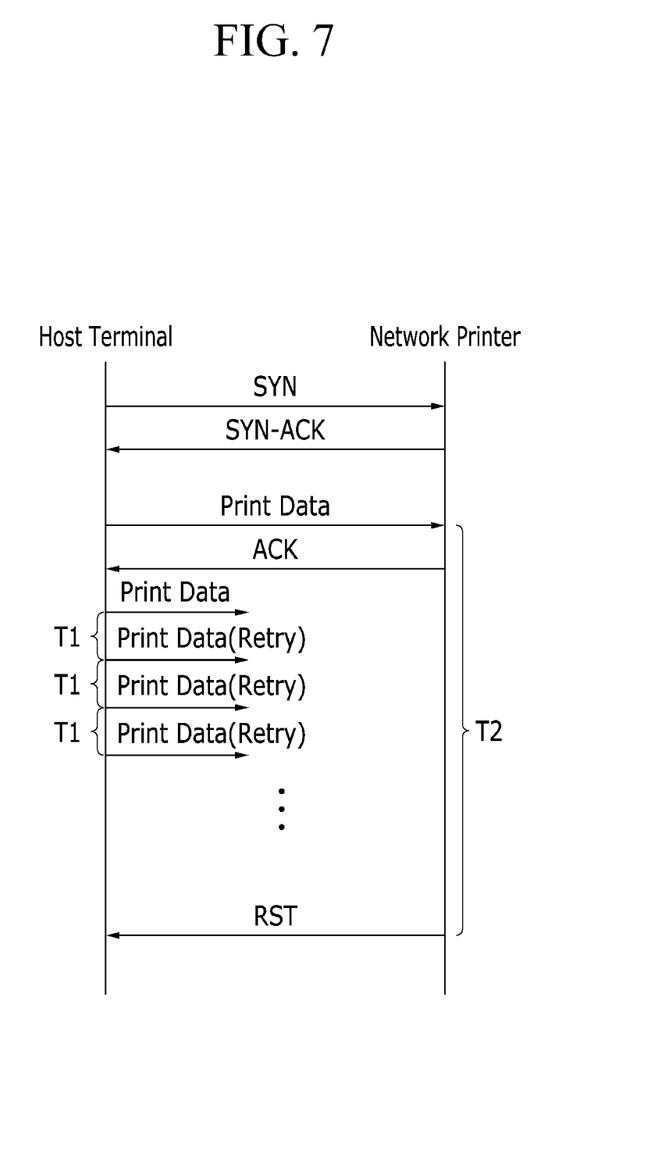
FIG. 7 is a flowchart of an operation example of the conventional art showing that a network failure occurs during transmission of print data.

An acknowledgement (ACK) from the network printer, not shown in FIG. 6, is received by the host terminal whenever a packet of print data (a print data packet) is transmitted. When the acknowledgment is received, another print data packet is transmitted. If the acknowledgement is not received by the host terminal within a predetermined time-out period T1 (five seconds, for example), the failed print data packet is retried by the host terminal as shown in FIG. 7.

On the side of the network printer, if another print data packet is not received within a predetermined time-out period T2 (five minutes, for example), a reset command (RST) is sent to the host terminal to forcibly disconnect the host terminal from the print port of the network printer. The connection of the host terminal via the print port is determined to have a network failure. The reset command causes the print port to be opened to the other host terminals. The print port is otherwise still occupied by the host terminal possibly having the network failure, preventing the other host terminals from using the network printer.

The finish command (FIN) is, however, not retried even if the time-out period T1 elapses. If the FIN command from the host terminal is lost due to a network failure, the connection established with the particular host terminal is kept until the reset command (RST) is sent from the network printer only after the time-out period T2 elapses. This raises a problem preventing the other host terminals from using the network printer until the time-out period T2 elapses even if transmission of print data from the host terminal has been successfully completed.

In a well-known conventional art, when a print data transmission error is detected, another communication path is established between an information processing apparatus and a printer with the failed communication path kept connected therebetween, allowing the information processing apparatus to obtain status information of the printer (refer to Japanese patent application publication No. H10-40025). According to the disclosure, if status information as such detected is a paper jam, a printer cover open, or a paper failure (showing that a desired size of paper is not set), the printer is determined to be disabled, and print data transmission is thereby terminated by the information processing apparatus.

According to the disclosure, it would be possible to control the connection (the communication path) depending on the printer status to thereby terminate print data transmission when the printer is temporarily inactive. If, however, a network failure occurs on the connection via the print port after successful completion of print data transmission, the print port is kept occupied by the particular host terminal, preventing the other host terminals from using the network printer.

SUMMARY

The purpose of the present invention is to solve the above problem. Even if a finish command from the host terminal is lost due to a network failure after successful completion of print data transmission, the other host terminals are allowed to use the network printer without waiting the elapse of the time-out period.

To solve the above problem, in a network printing system of the present invention, upon completion of transmission of print data from the host terminal to the network printer via the print port assigned to the network printer, the host terminal is configured to send a finish command to the network printer via the print port, instructing a disconnection of the host terminal from the print port of the network printer, and further to send a forced disconnection request command via a communication port different from the print port, requesting a forced disconnection of the host terminal from the print port of the network printer. The network printer is configured to disconnect the host terminal from the print port in response to the finish command received via the print port. The network printer is further configured to execute the forced disconnection of the host terminal from the print port in response to the forced disconnection request command received via the different port if the finish command sent via the print port has not been received.

Accordingly, even if the finish command from the host terminal is lost due to a network failure after successful completion of print data transmission, the network printer is allowed to forcibly execute the disconnection of the host terminal from the print port of the network printer in response to the forced disconnection request command received via the communication port different from the print port. The print port is thereby opened to the other host terminals upon completion of print data transmission regardless of any network failure on the print port connection of the particular host terminal, and the other host terminals are thereby allowed to use the network printer without waiting the elapse of the time-out period.

DETAILED DESCRIPTION

Figure 1A:
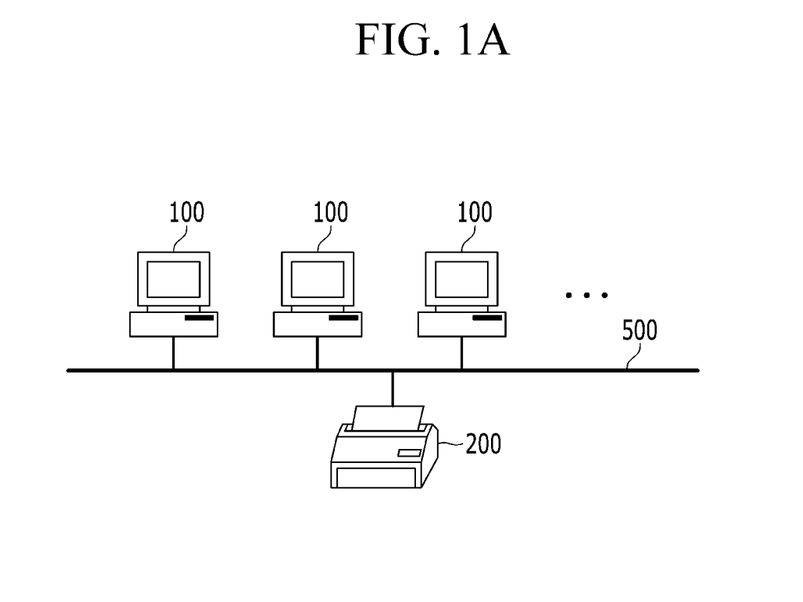
FIG. 1A is a configuration example of a network printing system of the embodiment of the present invention.

An embodiment of the present invention is described with reference to the accompanying drawings. FIG. 1A is a configuration example of a network printing system of the embodiment of the present invention. The network printing system of the embodiment includes a plurality of host terminals 100 and a network printer 200 mutually connected via a network 500 such as LAN (Local Area Network) and WAN (Wide Area Network), allowing the network printer 200 to be shared by the plurality of the host terminals 100.

In FIG. 1A, the network printer 200 has a built-in print server. Each of the host terminals 100 is adapted to directly transmit print data to the network printer 200 connected to the network 500. The network printer 200 is adapted to store the print data each transmitted from the host terminals 100 each in the internal print server (a buffer), and to read out the data from the buffer for print out in order.

Figure 1B:
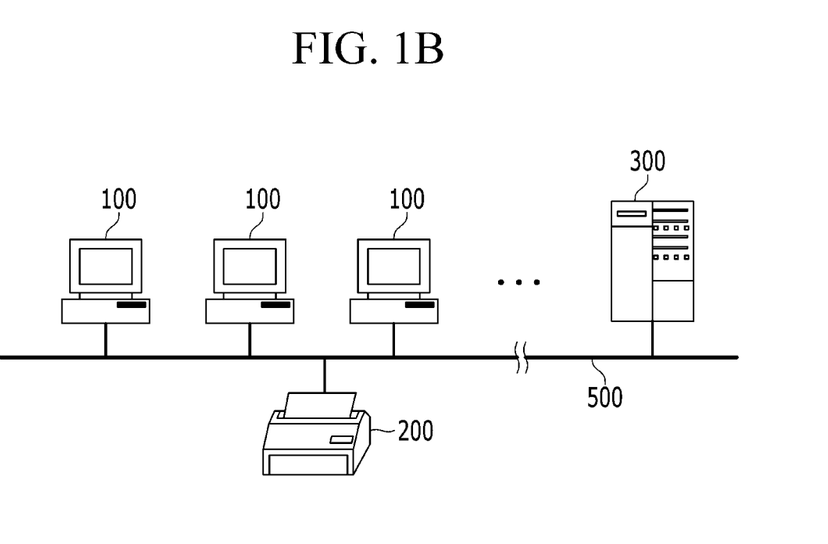
FIG. 1B is another configuration example of the network printing system of the embodiment of the present invention.

FIG. 1B is another configuration example of the network printing system of the embodiment of the present invention. The network printing system may further include a print server 300. Each of the host terminals 100 may be adapted to transmit print data to the network printer 200 via the print server 300. The print server 300 may be adapted to store the print data each transmitted from the host terminals 100 each, and to transmit the data to the network printer 200 for print out in order. In FIG. 1A and FIG. 1B, in response to a plurality of print commands each from the plurality of host terminals 100 each, the network printer 200 is adapted to store print data each transmitted from the host terminals each in order and then to print the stored print data in order.

Figure 2:
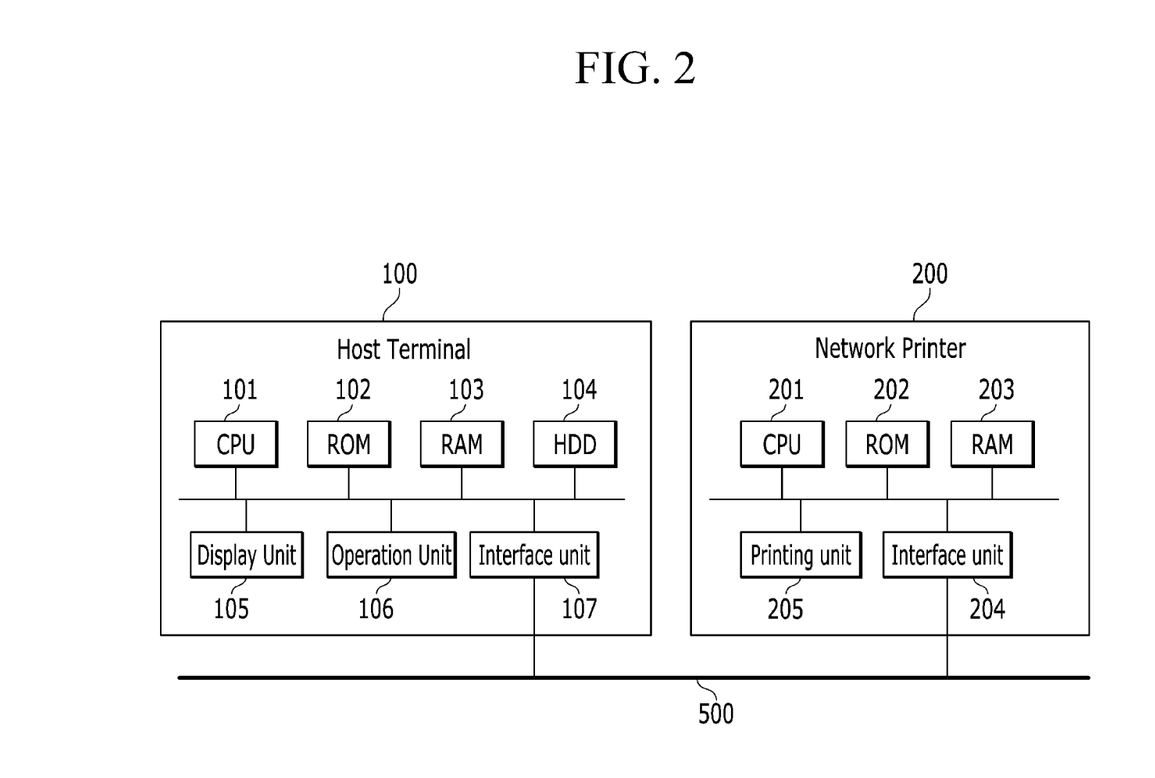
FIG. 2 is a block diagram showing a hardware configuration of a host terminal and a network printer of the embodiment of the present invention.

FIG. 2 is a block diagram showing a hardware configuration of the host terminal 100 and the network printer 200 of the embodiment of the present invention. The hardware configuration of the host terminal 100 includes a CPU (Central Processing Unit) 101, a ROM (Read Only Memory) 102, a RAM (Random Access Memory) 103, a hard disc drive 104, a display unit 105 such as a liquid crystal display, an operation unit 106 such as a keyboard, mouse, and touch panel, and an interface unit 107.

The CPU 101 is adapted to control the operation of the host terminal 100 in accordance with a program stored in the ROM 102, the RAM 103 or the hard disc drive 104. The interface unit 107 is adapted to communicate various data with the network printer 200 connected to the network 500.

The interface unit 107 is, in compliance with the TCP/IP (Transmission Control Protocol/Internet Protocol), adapted to open a plurality of communication ports simultaneously to allow communication via the plurality of communication ports. In this embodiment, the plurality of communication ports includes a communication port for print data transmission and a communication port for forced disconnection of the host terminal from the print port. Either port may be assigned an arbitrary port number by the interface unit 107 whenever a print instruction is given from the host terminal 100 to the network printer 200.

The hardware configuration of the network printer 200 includes a CPU 201, a ROM 202, a RAM 203, an interface unit 204, and a printing unit 205. The CPU 201 is adapted to control the operation of the network printer 200 in accordance with a program stored in the ROM 202 or the RAM 203. Any print data transmitted from the host terminals 100 each or the print server 300 is stored in the RAM 203 as a buffer and then passed to the printing unit 205 for print out. The buffer may be any other storage medium such as a hard disc drive and a semiconductor memory The interface unit 204 is adapted to communicate various data with the host terminals 100 each connected to the network 500. The interface unit 204 is, in compliance with the TCP/IP, adapted to open a plurality of communication ports simultaneously to allow communication via the plurality of communication ports. In this embodiment, the plurality of communication ports includes a communication port for print data transmission (a print port) and a communication port for forced disconnection of the host terminal from the print port (a forced disconnection port). Either port is previously assigned a port number.

The interface unit 204 may be integrally formed with the network printer 200 or may be detachable, for example, in the form of a network card.

Figure 3:
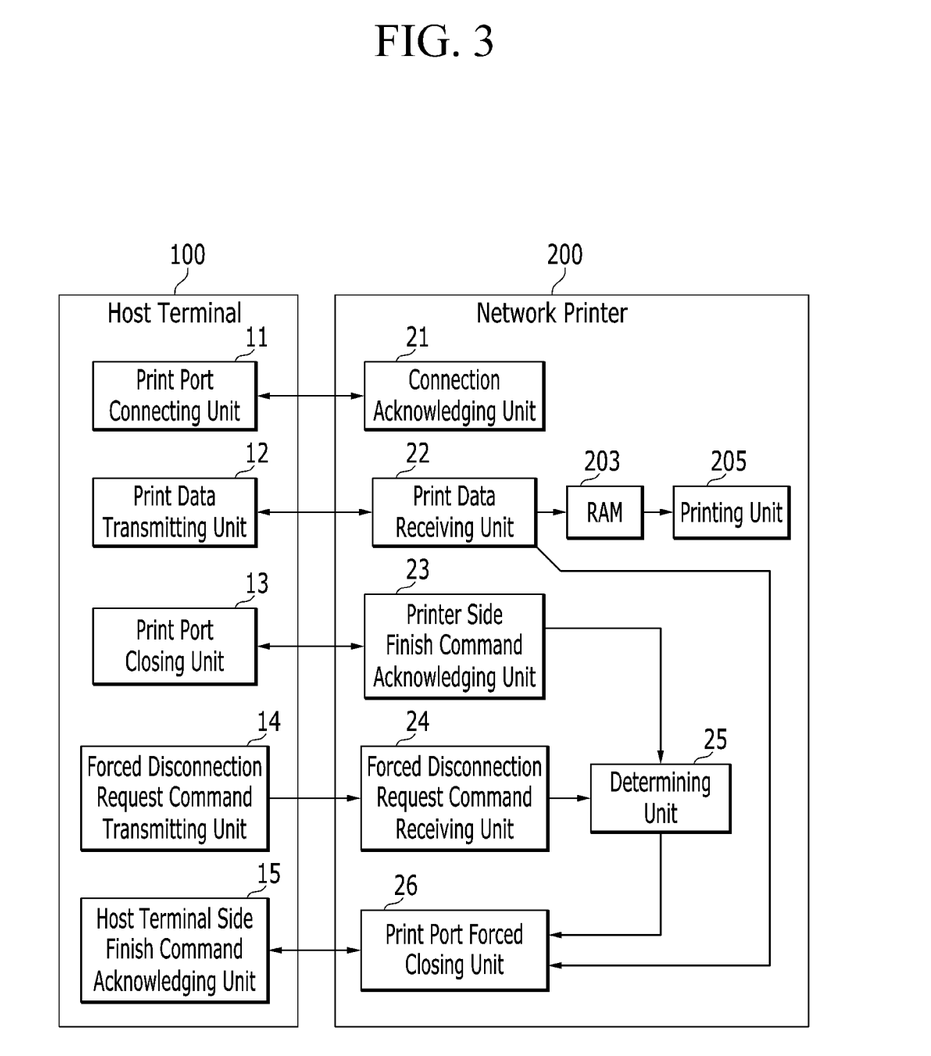
FIG. 3 a block diagram showing a software configuration of the host terminal and the network printer of the embodiment of the present invention.

FIG. 3 is a block diagram showing a software configuration of the host terminal 100 and the network printer 200 of the embodiment. FIG. 3 shows a major software configuration related to the operation of the embodiment, including part of the hardware configuration of the network printer 200 as shown in FIG. 2.

The software configuration of the host terminal 100 includes a print port connecting unit 11, a print data transmitting unit 12, a print port closing unit 13, a forced disconnection request command transmitting unit 14, and a host terminal side finish command acknowledging unit 15. The functional units 11 to 15 may be operated under control of the CPU 101 in accordance with the program stored in the ROM 102, RAM 103 or the hard disc drive 104 as shown in FIG. 2.

The software configuration of the network printer 200 includes a connection acknowledging unit 21, a print data receiving unit 22, a printer side finish command acknowledging unit 23, a forced disconnection request command receiving unit 24, a determining unit 25, and a print port forced closing unit 26. The functional units 21 to 26 may be operated under control of the CPU 201 in accordance with the program stored in the ROM 202 or the RAM 203 as shown in FIG. 2.

The print port connecting unit 11 of the host terminal 100 is adapted to send a connection request command (SYN) to the network printer 200 via the print port previously assigned to the network printer 200. The connection acknowledging unit 21 of the network printer 200 is adapted to receive the connection request command (SYN) and to return a connection acknowledgement (SYN-ACK) to the host terminal 100, thereby establishing a connection of the host terminal 100 via the print port.

The print data transmitting unit 12 of the host terminal 100 is adapted to continuously transmit a print data packet to the network printer 200 via the established print port connection. The print data receiving unit 22 of the network printer 200 is adapted to continuously receive a print data packet and to return an acknowledgement (ACK) to the host terminal 100 whenever receiving a print data packet.

The print data transmitting unit 12 is adapted to wait an acknowledgement (ACK) from the network printer 200 whenever sending a print data packet and to transmit another print data packet whenever receiving the acknowledgement (ACK). If an acknowledgement (ACK) is not received within a predetermined time-out period T1 (five seconds, for example) after transmission of a print data packet, the print data transmitting unit 12 is adapted to retry the transmission of the unsuccessful print data packet.

The print data packet received by the print data receiving unit 22 is stored in the RAM 203 in order. The printing unit 205 is adapted to print the stored print data packet in order. The printing unit 205 may not initiate printing until print data transmission are entirely completed or until only a predetermined amount of print data is stored in the RAM 203.

Upon completion of print data transmission via the print port, the print port closing unit 13 of the host terminal 100 is adapted to send a finish command (FIN), an instruction to disconnect the host terminal 100 from the print port of the network printer. The printer side finish command acknowledging unit 23 is adapted to receive the finish command (FIN) via the print port and return a finish acknowledgement (FIN-ACK) to the host terminal 100, thereby disconnecting the host terminal 100 from the print port of the network printer.

After transmission of the finish command (FIN) by the print port closing unit 13, the forced disconnection request command transmitting unit 14 of the host terminal 100 is adapted to send a forced disconnection request command via the forced disconnection port, which is a different port from the print port, requesting a forced disconnection of the host terminal 100 from the print port of the network printer.

Particularly, the forced disconnection request command transmitting unit 14 is adapted to first send a connection request command (SYN) to the network printer 200 via the forced disconnection port previously assigned to the network printer 200. The network printer 200 returns a connection acknowledgement (SYN-ACK) to the host terminal 100, thereby establishing the connection via the forced disconnection port with regard to the host terminal 100. The forced disconnection request command transmitting unit 14 is adapted to then send a forced disconnection request command via the forced disconnection port, requesting a forced disconnection of the host terminal 100 from the print port of the network printer 200.

The forced disconnection request command receiving unit 24 of the network printer 200 is adapted to receive the forced disconnection request command sent via the forced disconnection port. The determining unit 25 is adapted to determine whether the forced disconnection request command receiving unit 24 receives the forced disconnection request command sent via the forced disconnection port while the printer side finish command acknowledging unit 23 has never received the finish command via the print port, thereby accordingly deciding an execution of a forced disconnection of the host terminal 100 from the print port of the network printer.

Particularly, a forced disconnection is decided to be executed if it is determined that the forced disconnection request command sent via the forced disconnection port is received by the forced disconnection request command receiving unit 24 while the finish command sent via the print port has never been received by the printer side finish command acknowledging unit 23. A forced disconnection is decided not to be executed if it is determined that the finish command sent via the print port has been received by the printer side finish command acknowledging unit 23 before the forced disconnection request command sent via the forced disconnection port is received by the forced disconnection request command receiving unit 24.

If a forced disconnection of the host terminal 100 from the print port is decided to be executed, the print port forced closing unit 26 is adapted to send a reset command (RST) to the host terminal 100 via the forced disconnection port, thereby forcibly disconnecting the host terminal 100 from the print port of the network printer and further to send information on the execution of forced disconnection ("01h" for example) to the host terminal 100 via the forced disconnection port. If a forced disconnection is decided not to be executed, the print port forced closing unit 26 is adapted to send information on the cancellation of forced disconnection ("00h" for example) to the host terminal 100 via the forced disconnection port.

In executing a forced disconnection, it is necessary to specify the communication port having the network failure among the plurality of host terminals 100 connected to the network 500. In this embodiment, the forced disconnection request command transmitting unit 14 is adapted to add a port number (variably assigned whenever connected to the print port) of the host terminal 100 into the forced disconnection request command. The print port forced closing unit 26 of the network printer 200 is thereby allowed to execute the forced disconnection of the specified port, as designated by the port number, of the host terminal 100 connected to the print port.

It is further preferable that the forced disconnection request command includes an Internet Protocol address (IP address) of the host terminal 100 in addition to the port number thereof. Then, the print port forced closing unit 26 of the network printer 200 is allowed to execute the forced disconnection of the specified port of the specified host terminal 100, as designated by the IP address, connected to the print port.

After transmission of the "01h" or "00h" information, the print port forced closing unit 26 is adapted to send a finish command (FIN) via the forced disconnection port, instructing disconnecting the host terminal 100 from the forced disconnection port of the network printer 200. The host terminal side finish command acknowledging unit 15 is adapted to receive the finish command (FIN) and return a finish acknowledgement (FIN-ACK) to the network printer 200, thereby disconnecting the host terminal 100 from the forced disconnection port of the network printer 200.

The print port forced closing unit 26 may also execute a forced disconnection of the host terminal 100 from the print port when a predetermined time-out period T2 (five minutes, for example) elapses without receiving any of print data, a finish command or a forced disconnection request command. If the print data receiving unit 22 does not receive another print data packet within the predetermined time-out period T2 (see FIG. 7), the print port forced closing unit 26 may send a reset command (RST) to the host terminal 100 via the print port, thereby forcibly disconnecting the host terminal 100 from the print port of the network printer 200.

Figure 4:
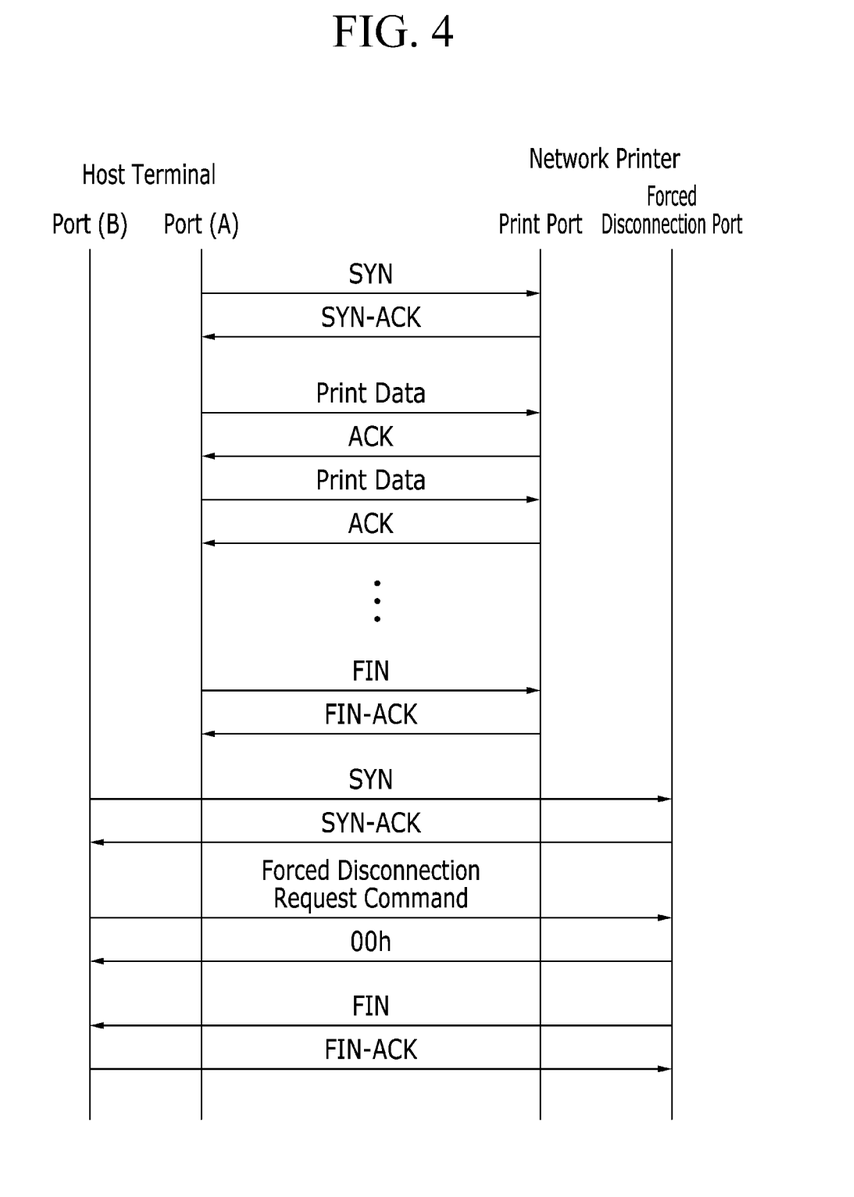
FIG. 4 is a flowchart of an operation example of the embodiment showing that print data transmission is successfully completed without a network failure.
Figure 5:
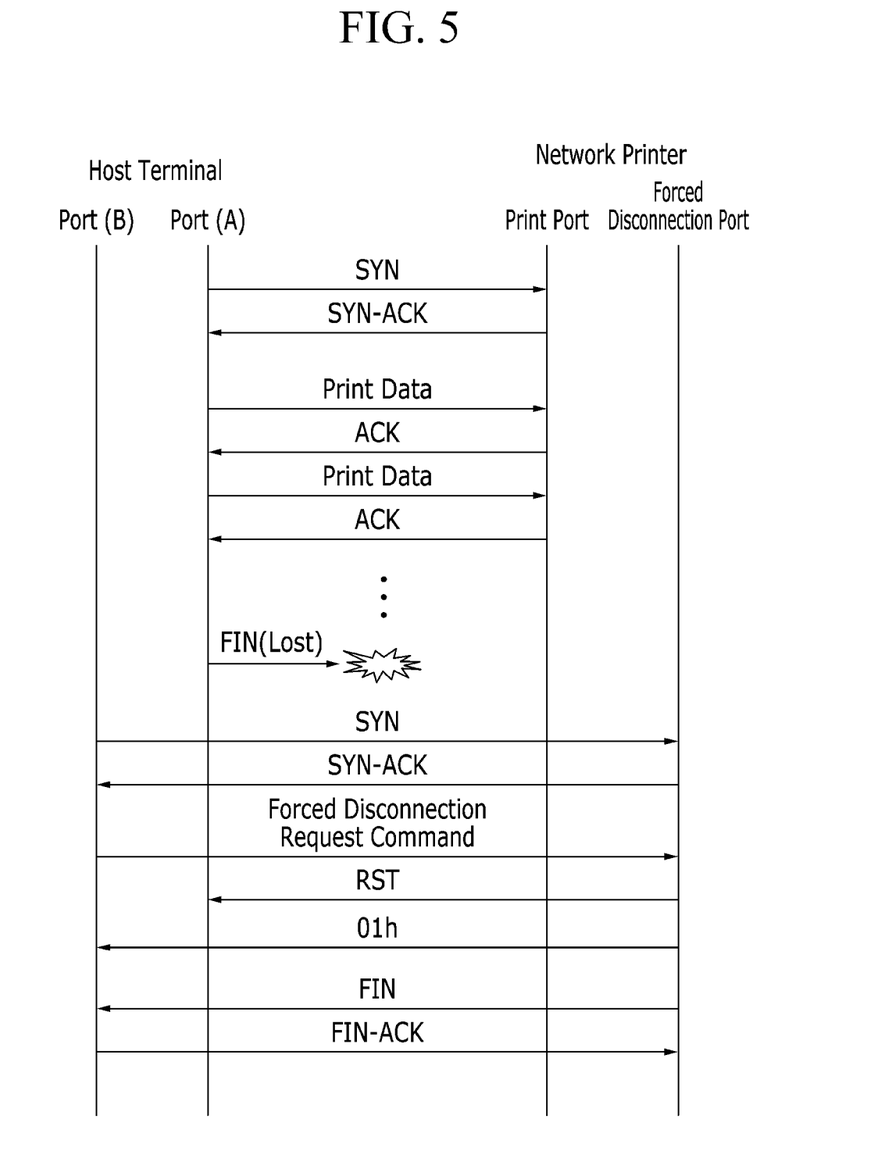
FIG. 5 is a flowchart of an operation example of the embodiment showing that a finish command from the host terminal is not received by the network printer due to a network failure occurring after completion of print data transmission.

The operation of the network printing system of the embodiment as configured above is being described. FIG. 4 is a flowchart of an operation example of the embodiment showing that print data transmission is successfully completed without a network failure. FIG. 5 is a flowchart of an operation example of the embodiment showing that a finish command from the host terminal is not received by the network printer due to a network failure occurring after completion of print data transmission.

When a print instruction is given at the host terminal 100, the print port connecting unit 11 of the host terminal 100 sends a connection request command (SYN) from a communication port (A) arbitrarily assigned to the host terminal 100 to the print port previously assigned to the network printer 200.

The connection acknowledging unit 21 of the network printer 200 receives the connection request command (SYN) via the print port and returns a connection acknowledgement (SYN-ACK) to the host terminal 100, thereby establishing a connection of the host terminal 100 via the print port.

The print data transmitting unit 12 of the host terminal 100 continuously transmits a print data packet to the network printer 200 via the established print port connection. The print data receiving unit 22 of the network printer 200 continuously receives a print data packet, and returns an acknowledgement (ACK) to the host terminal 100 whenever receiving a print data packet. It is herein assumed that all the packets are successfully transmitted.

Upon completion of print data transmission via the print port, the print port closing unit 13 of the host terminal 100 sends a finish command (FIN) to the network printer 200 via the print port, instructing disconnecting the host terminal 100 from the print port. The printer side finish command acknowledging unit 23 receives the finish command (FIN) and returns a finish acknowledgement (FIN-ACK) to the host terminal 100, thereby disconnecting the host terminal 100 from the print port of the network printer 200.

Immediately after the finish command (FIN) is transmitted from the print port closing unit 13, the forced disconnection request command transmitting unit 14 of the host terminal 100 sends a connection request command (SYN) from a communication port (B) arbitrarily assigned to the host terminal 100 to the forced disconnection port previously assigned to the network printer 200, instructing an establishment of a connection via the forced disconnection port.

The forced disconnection request command receiving unit 24 of the network printer 200 returns a connection acknowledgement (SYN-ACK) to the host terminal 100, thereby establishing a connection of the host terminal 100 via the forced disconnection port.

The forced disconnection request command transmitting unit 14 then sends a forced disconnection request command to the network printer 200 via the forced disconnection port, requesting a forced disconnection of the host terminal 100 from the print port of the network printer 200. The forced disconnection request command may include an IP address of the host terminal 100 and a port number of the communication port (A) connected to the print port. The command is received by the forced disconnection request command receiving unit 24 of the network printer 200.

The determining unit 25 of the network printer 200 determines whether the forced disconnection request command receiving unit 24 receives the forced disconnection request command via the forced disconnection port while the printer side finish command acknowledging unit 23 has never received the finish command via the print port. In FIG. 4, the printer side finish command acknowledging unit 23 has received the finish command (FIN) via the print port and returned the finish acknowledgement (FIN-ACK) before the forced disconnection request command receiving unit 24 receives the forced disconnection request command via the forced disconnection port. Accordingly, the determining unit 25 decides not to execute a forced disconnection of the host terminal 100 from the print port. The print port forced closing unit 26 sends information on the cancellation of forced disconnection ("00h" for example) to the host terminal 100 via the forced disconnection port.

After transmission of the "00h" information, the print port forced closing unit 26 sends a finish command (FIN) to the host terminal 100 via the forced disconnection port, instructing disconnecting the host terminal 100 from the forced disconnection port of the network printer 200. The host terminal side finish command acknowledging unit 15 receives the finish command (FIN) and returns a finish acknowledgement (FIN-ACK) to the network printer 200, thereby disconnecting the host terminal 100 from the forced disconnection port of the network printer 200.

The operation is described referring to FIG. 5. The print data packets are entirely transmitted successfully similarly to FIG. 4. After transmission of print data, however, the finish command (FIN) sent by the print port closing unit 13 is lost due to a network failure between the communication port (A) of the host terminal 100 and the print port of the network printer 200. Accordingly, a finish acknowledgement (FIN-ACK) is not returned from the printer side finish command acknowledging unit 23, and thus the connection of host terminal 100 via the print port is still maintained.

Immediately after the finish command (FIN) is sent by the print port closing unit 13, the forced disconnection request command transmitting unit 14 of the host terminal 100 sends a connection request command (SYN) from a communication port (B) arbitrarily assigned to the host terminal 100 to the forced disconnection port previously assigned to the network printer 200, instructing an establishment of a connection via the forced disconnection port.

The forced disconnection request command receiving unit 24 of the network printer 200 returns a connection acknowledgement (SYN-ACK) to the host terminal 100, thereby establishing a connection of the host terminal 100 via the forced disconnection port.

The forced disconnection request command transmitting unit 14 then sends a forced disconnection request command to the network printer 200 via the forced disconnection port, requesting a forced disconnection of the host terminal 100 from the print port. The forced disconnection request command may include an IP address of the host terminal 100 and a port number of the communication port (A) connected to the print port. The command is received by the forced disconnection request command receiving unit 24 of the network printer 200.

The determining unit 25 of the network printer 200 determines whether the forced disconnection request command receiving unit 24 receives the forced disconnection request command via the forced disconnection port while the printer side finish command acknowledging unit 23 has never received the finish command via the print port. In FIG. 5, the forced disconnection request command receiving unit 24 receives the forced disconnection request command via the forced disconnection port while the printer side finish command acknowledging unit 23 has never received the finish command via the print port. Accordingly, the determining unit 25 decides to execute a forced disconnection of the host terminal 100 from the print port.

The print port forced closing unit 26 sends a reset command (RST) to the host terminal 100 via the forced disconnection port, thereby executing the forced disconnection and further sends information on the execution of forced disconnection ("01h" for example) to the host terminal 100 via the forced disconnection port.

After transmission of the "01h" information, the print port forced closing unit 26 sends a finish command (FIN) to the host terminal 100 via the forced disconnection port, instructing disconnecting the host terminal 100 from the forced disconnection port of the network printer 200. The host terminal side finish command acknowledging unit 15 receives the finish command (FIN) and returns a finish acknowledgement (FIN-ACK) to the network printer 200, thereby disconnecting the host terminal 100 from the forced disconnection port of the network printer 200.

As described above, according to the embodiment, upon completion of transmission of print data via the print port, the host terminal 100 sends a finish command via the print port, instructing disconnecting the host terminal 100 from the print port of the network printer 200, and further sends a forced disconnection request command via the forced disconnection port, which is a different port from the print port, requesting a forced disconnection of the host terminal 100 from the print port. The network printer 200 disconnects the host terminal 100 from the print port of the network printer 200 in response to the finish command successfully received via the print port. The network printer 200, however, if the finish command sent via the print port has not been received, executes a forced disconnection of the host terminal 100 from the print port in response to the forced disconnection request command received via the forced disconnection port.

Accordingly, even if a finish command (FIN) from the host terminal 100 is lost due to a network failure after successful completion of print data transmission, the network printer 200 is allowed to forcibly disconnect the host terminal 100 from the print port in response to the forced disconnection request command received via the communication port different from the print port. The print port is thereby opened to the other host terminals upon completion of print data transmission regardless of any network failure on the connection with regard to the particular host terminal, and the other host terminals 100 are allowed to use the network printer 200 without waiting the elapse of the time-out period.

In the embodiment, the connection via the forced disconnection port between the host terminal 100 and the network printer 200 is established when the connection request command (SYN) is sent from the communication port (B) of the host terminal 100 to the forced disconnection port of the network printer 200 after the finish command (FIN) is sent from the communication port (A) of the host terminal 100 to the print port of the network printer 200. The invention is not limited to this configuration. The connection via the forced disconnection port may be previously established, for example, immediately after the connection via the print port is established by the connection request command (SYN).

There is another problem not described above. A network failure possibly occurs with respect to the connection via the forced disconnection port established between the host terminal 100 and the network printer 200, undesirably occupying the forced disconnection port by the host terminal 100 having the network failure. To solve the problem, the print port forced closing unit 26 of the network printer 200 may execute a forced disconnection of the host terminal 100 from the forced disconnection port when a predetermined time-out period T3 (30 seconds, for example) elapses without receiving the forced disconnection request command after the host terminal 100 and the network printer 200 is connected via the forced disconnection port.

For example, the network printer 200 may have a plurality of communication ports for disconnection, and the host terminal 100 may, at a given interval, send a forced disconnection request command to each of the ports in order. The print port forced closing unit 26 of the network printer 200 may execute a forced disconnection of the host terminal 100 from the forced disconnection port if none of the forced disconnection request commands are received.

It will be apparent to those skilled in the art that various modifications and variations can be made in the present invention without departing from the scope or spirit of the invention. Thus, it is intended that the present invention cover the modifications and variations of this invention provided that they come within the scope of the appended claims or their equivalents.

What is claimed is:

1. A network printing system comprising a plurality of host terminals and a network printer connected to a network for common use by the plurality of host terminals, wherein;
the host terminals each comprising;
a print port closing unit configured to send a finish command to the network printer via a print port assigned to the network printer upon completion of print data transmission via the print port, the finish command instructing a disconnection of the host terminal from the print port of the network printer; and
a forced disconnection request command transmitting unit configured to send a forced disconnection request command to the network printer via a communication port different from the print port after transmission of the finish command, the forced disconnection request command requesting a forced disconnection of the host terminal from the print port of the network printer;

the network printer comprising;
- a finish command acknowledging unit configured to receive the finish command sent from the host terminal via the print port; and
- a print port forced closing unit configured to execute the forced disconnection of the host terminal from the print port via the communication port when the finish command is not received and the forced disconnection request command is received.

2. The network printing system of claim 1, wherein the forced disconnection request command transmitting unit of the host terminal is further configured to specify a port number of the host terminal in the forced disconnection request command, and the print port forced closing unit of the network printer is further configured to execute the forced disconnection of the host terminal from the print port in accordance with the specified port number.

3. The network printing system of claim 2, wherein the forced disconnection request command transmitting unit of the host terminal is further configured to specify an internet protocol address of the host terminal in the forced disconnection request command, and the print port forced closing unit of the network printer is further configured to execute the forced disconnection of the host terminal from the print port in accordance with the specified port number and the specified internet protocol address.

4. The network printing system of claim 1, wherein the print port forced closing unit of the network printer is further configured to execute the forced disconnection of the host terminal from the print port via the print port when a predetermined time-out period elapses without receiving any of the print data, the finish command, and the forced disconnection request command.

5. The network printing system of claim 1, wherein the print port forced closing unit of the network printer is further configured to execute the forced disconnection of the host terminal from the print port via the communication port when a predetermined time-out period elapses without receiving any of the print data, the finish command, and the forced disconnection request command.

6. The network printing system of claim 1, wherein the print port forced closing unit of the network printer is further configured to execute a forced disconnection of the host terminal from the communication port when a predetermined time-out period elapses without receiving the forced disconnection request command after the host terminal and the network printer is connected via the communication port.

7. A host terminal connected to a network and configured to transmit print data to a network printer for print out, comprising;
- a print port closing unit configured to send a finish command to the network printer via a print port assigned to the network printer upon completion of print data transmission via the print port, the finish command instructing a disconnection of the host terminal from the print port of the network printer; and
- a forced disconnection request command transmitting unit configured to send a forced disconnection request command to the network printer via a communication port different from the print port after transmission of the finish command, the forced disconnection request command requesting a forced disconnection of the host terminal from the print port of the network printer.

8. The host terminal of claim 7, wherein the forced disconnection request command transmitting unit is further configured to specify a port number of the host terminal in the forced disconnection request command.

9. The host terminal of claim 8, wherein the forced disconnection request command transmitting unit is further configured to specify an internet protocol address of the host terminal in the forced disconnection request command.

10. A network printer configured to receive print data from a plurality of host terminals connected to a network, comprising;
- a finish command acknowledging unit configured to receive a finish command sent from the host terminals each via a print port assigned to the network printer upon completion of print data transmission via the print port;
- a forced disconnection request command receiving unit configured to receive a forced disconnection request command sent from the host terminals each via a communication port different from the print port after the receipt of the finish command, the forced disconnection request command requesting a forced disconnection of the host terminal from the print port of the network printer; and
- a print port forced closing unit configured to execute the forced disconnection of the host terminal from the print port via the communication port when the finish command is not received and the forced disconnection request command is received.

11. The network printer of claim 10, wherein the print port forced closing unit is further configured to execute the forced disconnection of the host terminal from the print port in accordance with a port number of the host terminal specified in the forced disconnection request command.

12. The network printer of claim 11, wherein the print port forced closing unit is further configured to execute the forced disconnection of the host terminal from the print port in accordance with the port number and an internet protocol address of the host terminal specified in the forced disconnection request command.

13. The network printer of claim 10, wherein the print port forced closing unit is further configured to execute the forced disconnection of the host terminal from the print port via the print port when a predetermined time-out period elapses without receiving any of the print data, the finish command, and the forced disconnection request command.

14. The network printer of claim 10, wherein the print port forced closing unit is further configured to execute the forced disconnection of the host terminal from the print port via the communication port when a predetermined time-out period elapses without receiving any of the print data, the finish command, and the forced disconnection request command.

15. The network printer of claim 10, wherein the print port forced closing unit is further configured to execute a forced disconnection of the host terminal from the communication port when a predetermined time-out period elapses without receiving the forced disconnection request command after the host terminal and the network printer is connected via the communication port.

* * * * *